July 7, 1959

J. L. WILLIAMS ET AL 2,893,684

CORROSION RESISTANT GATE VALVE

Filed June 11, 1957

INVENTORS
JOHN L. WILLIAMS
STANLEY L. KUM
BY
Buckhorn, Cheatham & Bloor
ATTORNEYS

United States Patent Office 2,893,684
Patented July 7, 1959

2,893,684

CORROSION RESISTANT GATE VALVE

John L. Williams, Oswego, and Stanley L. Kum, Portland, Oreg.

Application June 11, 1957, Serial No. 664,981

7 Claims. (Cl. 251—328)

This invention relates to bonnetless gate valves and particularly to such valves that are capable of handling corrosive liquids without being detrimentally affected thereby. More in particular, the present invention is concerned with bonnetless gate valves that have those parts thereof that come in contact with the fluid to be controlled constructed of a plastic material which is resistant to the action of corrosive fluids.

Valves of the type under consideration are expensive because of the expensive material from which they are constructed and, heretofore, also because of the complexity of their construction, particularly the complexity of the packing gland assembly thereof which surrounds the gate blade at the place the blade projects from the valve body.

It is a main object of the present invention to provide a valve of the type under consideration which is simpler and less expensive than prior valves of such type.

Another object of the invention is to provide a valve of the type under consideration which has a simple and inexpensive packing arrangement for the gate blade of the valve.

A more specific object of the present invention is to provide a gate valve having a valve body including a plastic valve body unit slidably receiving a gate blade, and in which the plastic body unit is reinforced at the place the blade projects from the body to facilitate the provision of a simple packing assembly at such place.

Various other objects of the invention will be apparent from the following description taken in connection with the accompanying drawings wherein.

Figure 1:
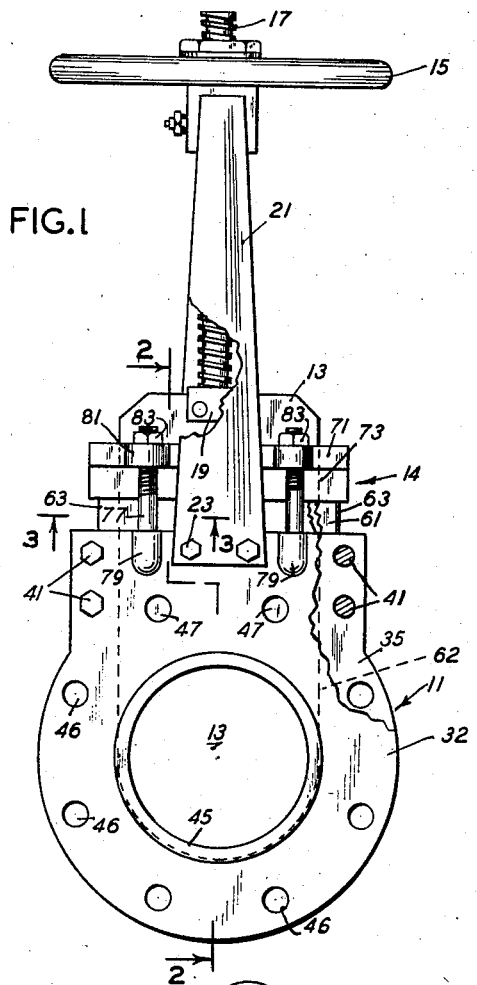
Fig. 1 is an end view of a valve embodying the concepts of the present invention, parts being broken away for convenience in illustration.

The drawings disclose a bonnetless gate valve which generally includes a valve body 11 having a flow passage 12 therethrough which is shown as being closed by a gate blade 13 which projects from the body through a packing gland assembly 14. The gate blade may be raised and lowered by the operation of a handwheel 15 which threadedly receives a rising stem 17, which is connected to the gate blade 13 by a clevis unit 19. The handwheel is rotatably mounted on the upper ends of a pair of yoke arms 21 which are connected at their lower ends by bolts 23 to the valve body 11.

The valve body 11 comprises a number of plates of generally similar form secured together in sandwich relation. The plates include inlet and outlet metal bolting flanges 31 and 32 clamped against the opposite faces of a plastic body unit, which includes inlet and outlet plates 33 and 35 disposed on the opposite sides of a central spacer plate 37. The plastic parts of the valve preferably are formed of a material such as polyvinylchloride. The bolting flanges 31 and 32 and the plates 33 and 35 are of generally keyhole shape, as is apparent from Fig. 1, whereas the spacer plate 37 is of generally U-shape.

All of the above-mentioned five plates are formed with matching holes to receive bolts 41 which secure the parts together. Independently of the bolts 41, the plastic pieces 33, 35 and 37 are bonded together by a suitable adhesive material.

A ring-shaped insert 43 of plastic material fits into openings formed in the inlet bolting flange 31 and the inlet plate 33 and is adhesively secured to the plate 33. A similar insert 45 is provided for the bolting flange 32 and the outlet plate 35. The rings 43 and 45 define the flow passage 12, previously mentioned, and project outwardly beyond the outer faces of the bolting flanges 31 and 32 for engagement with plastic or plastic lined pipe not shown. The valve body 11 may be secured in a pipe line and to the flanges of the pipe of the line by means of through bolts, now shown, which extend through holes 46 formed in the valve body, and also by means of other bolts which thread into blind threaded holes 47 formed in the bolting flanges 31 and 32.

The U-shaped spacer 37 together with the plates 33 and 35 provide a slot-like gate guideway intersecting the flow passage 12, and slidably received within this guideway is the gate blade 13. The gate blade preferably has a beveled lower edge 48, which, in the lower position of the blade, engages a wedge portion 49 on the ring 45 so that the blade 13 is cammed over against a valve seat 51 provided by the insert 43.

Figure 2:
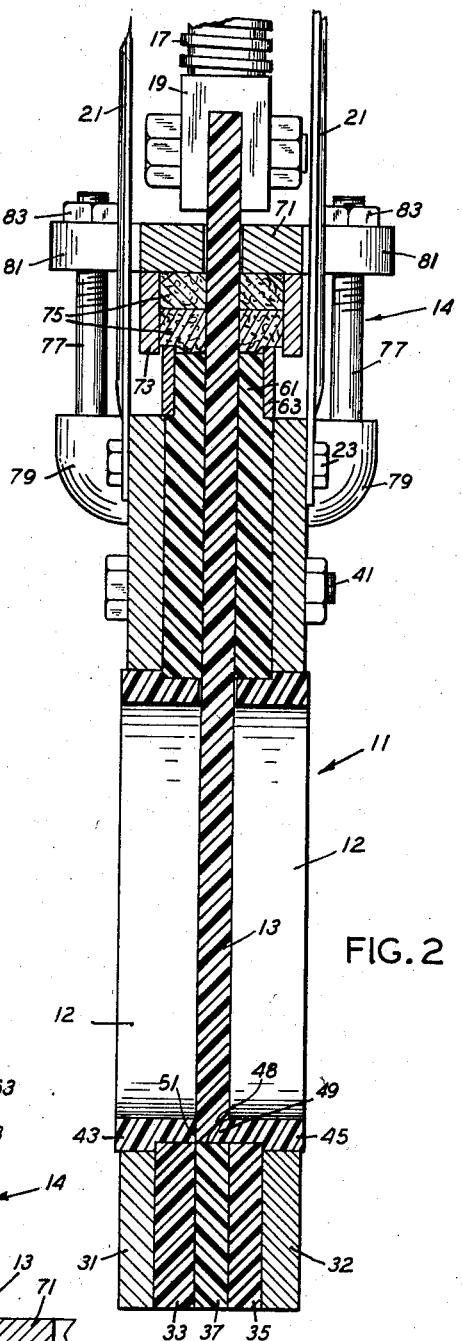
Fig. 2 is a partial vertical section, on an enlarged scale, taken along line 2—2 of Fig. 1.

The plastic plates 33 and 35 are exteriorly reduced at the upper portions thereof as the parts are shown in Figs. 1 and 2 to provide upwardly projecting portions 61 which extend beyond the confines of the bolting flanges 31 and 32. The upper ends of the spacer 37 are similarly formed to provide portions 62, which are best shown in Fig. 3.

Figure 3:
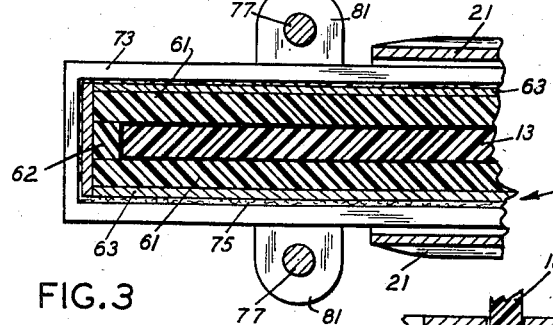
Fig. 3 is a partial horizontal section, on an enlarged scale, taken along line 3—3 of Fig. 1.

Clamped about these upwardly projecting portions 61 and 62 and securing them against separation and against fracture is an endless metal band 63 of open rectangular form, as best shown in Fig. 3. The metal band has the upper edges thereof, as the parts are shown in Fig. 2, projecting beyond the portions 61 and 62 of the plates 33, 35 and 37.

The packing assembly 14, previously mentioned, includes an inverted packing box composed of a plate 71, which is slotted to accommodate the blade 13, and an endless rectangular flange 73 secured to the lower face of the plate 71 and providing a packing recess. As is apparent from Fig. 3, the recess is wider and longer than the metal band 63, and the flange 73 of the box surrounds the upper edge of the metal band 63 in spaced relation with respect thereto, as is shown in Fig. 2. Disposed within the packing box are two pieces of packing 75 of rectangular loop-shape which engage the upper edge of the metal band 63.

The packing box is connected to the bolting flanges 31 and 32 by stud bolts 77, which are secured at the lower ends thereof to lugs 79 provided on the bolting flanges, and which extend through ears 81 provided on the packing box. Nuts 83 provided on the upper ends of the stud bolts serve to force the box downwardly so that the packing 75 is pressed against the upper edge of the metal band 63 to form a seal therewith. The packing is also pressed into engagement with the upper ends of the portions 61 and 62 of the plates 33, 35 and 37. This latter engagement is normally sufficient to prevent corrosive fluids in the valve body from coming into contact with the metal band 63.

Figure 4:
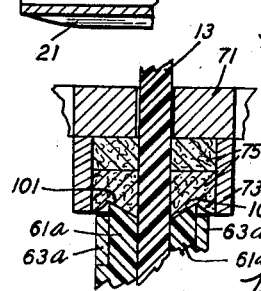
Fig. 4 is a fragmentary vertical section showing the packing assembly of a modified valve.

Fig. 4 shows a modified form of the invention which is similar to the first-described form with the exception of the formation of the upwardly projecting portions of the plastic body plates. In Fig. 4 the plates corresponding to the plates 33 and 35 of Figs. 2 and 3 have upwardly projecting portions 61a, but the upper ends of these portions project beyond the upper edges of the band 63a and are beveled inwardly and downwardly to provide sharp edges 101 for engaging the packing 75 of the packing box 71. The modified valve also has a spacer plate having upwardly projecting portions, not shown, which are beveled at their upper ends like portions 61a to provide a trough with inclined sides surrounding the blade 13.

In this form of the invention, there is absolute assurance that the corrosive liquids in the valve body cannot come in contact with the band 63a. However, certain types of plastic material have a tendency to fracture or to readily deform or bend, and some of these types are less expensive than the types which are not so frail, and hence desirable to use. In such case, it may be more desirable to follow the first-described form of the invention in which the metal band 63 takes the full thrust of the packing box and hence there are no exposed plastic edges to be broken.

Although the reinforcing band finds particular utility in making possible the provision of a sandwich type valve body composed of relatively thin parts, the band could also be applied to a molded one-piece body in a manner which is apparent from the drawings and previous description.

Having described the invention in what is considered to be the preferred embodiment thereof, it is desired that it be understood that the invention is not to be limited other than by the provisions of the following claims.

We claim:

1. A bonnetless gate valve comprising a fabricated valve body including a relatively flat plate-like body unit of rigid plastic material, said body unit being formed with a flow passage therethrough in a direction normal to the plane thereof, said body unit being formed with a slot-like gate guideway extending parallel to the plane of said body unit and intersecting said flow passage, a gate blade movably positioned in said guideway and projecting from said body unit, a metal bolting flange secured to each of the opposite faces of said body, unit said body unit having portions surrounding said blade at the place said blade projects from said body unit, said portions projecting beyond the confines of said bolting flanges in the direction of movement of said gate blade, said body including a metal band clamped about said portions to reinforce the same against fracture, an inverted packing box having a recess which is wider and longer than said portions and which is defined in part by an endless flange which surrounds at least the edge of said band remote from said flow passage, packing contained within said recess and forming a seal with said blade and said body at said place, and means connecting said box and bolting flanges and serving to draw said box toward said body to apply pressure between said packing and said blade and body.

2. A bonnetless gate valve comprising a fabricated valve body including a relatively flat plate-like body unit of rigid plastic material, said body unit being formed with a flow passage therethrough in a direction normal to the plane thereof, said body unit being formed with a slot-like gate guideway extending parallel to the plane of said body unit and intersecting said flow passage, a gate blade movably positioned in said guideway and projecting from said body unit, a metal bolting flange secured to each of the opposite faces of said body unit, said body unit having portions surrounding said blade at the place said blade projects from said body unit, said portions projecting beyond the confines of said bolting flanges in the direction of movement of said gate blade, said body including a metal band clamped about said portions to reinforce the same against fracture, an inverted packing box having a recess which is wider and longer than said portions and which is defined in part by an endless flange which surrounds at least the edge of said band remote from said flow passage, packing contained within said recess and forming a seal with said blade and said body at said place, and means connecting said box and bolting flanges and serving to draw said box toward said body to apply pressure between said packing and said blade and body, said band projecting beyond said portions to provide a rim, said packing being pressed against said rim to form a seal therewith.

3. A bonnetless gate valve comprising a valve body including a body unit of a nonmetallic corrosion resistant material, said body unit being formed to provide a flow passage and a gate guideway intersecting said flow passage, a gate blade movably positioned in said guideway and projecting from said body unit, said body unit having portions surrounding said blade at the place said blade projects from said body unit, said body also including metal reinforcing means surrounding and engaging said portions to reinforce the same, and a packing assembly surrounding said blade at said portion and forming a seal with said blade and said body at such place.

4. A bonnetless gate valve comprising a fabricated valve body including a sandwich type body unit composed of an inlet plate, a spacer plate and an outlet plate secured together and providing a flow passage and a gate guideway intersecting said flow passage, a gate blade movably positioned in said guideway and projecting from said body unit, said plates providing portions surrounding said blade at the place said blade projects from said body unit, said body also including reinforcing means surrounding and engaging said portions to reinforce them against separation, and a packing assembly surrounding said blade at said portions and forming a seal with said blade and said body at such place.

5. A bonnetless gate valve comprising a body unit formed of a first material, said body unit being formed with a flow passage therethrough, said body unit being formed with a gate guideway intersecting said flow passage, a gate blade movably positioned in said guideway and projecting from said body unit, said body unit having portions surrounding said blade at the place said blade projects from said body unit, a band around said portions to reinforce the same against fracture, said band being constructed of a second material having a higher tensile strength than said first material, an inverted packing box having a recess which is wider and longer than said portions and which is defined in part by an endless flange which surrounds at least the edge of said band remote from said flow passage, packing contained within said recess and forming a seal with said blade and said body at said place, and means to draw said box toward said body to apply pressure between said packing and said blade and body, said band projecting beyond said portions to provide a rim, said packing being pressed against said rim to form a seal therewith.

6. A valve as set forth in claim 3 in which the metal reinforcing means provides an upstanding rim engaged by packing of said packing assembly.

7. A valve as set forth in claim 4 in which said reinforcing means provides an upstanding rim engaged by packing of said packing assembly.

References Cited in the file of this patent

UNITED STATES PATENTS 2,669,416    Hilton _____ Feb. 16, 1954

OTHER REFERENCES

Product Engineering Bulletin No. 1, published in 1955 by The Polychemicals Dept., E. I. du Pont de Nemours & Co., Inc. (251–368).